United States Patent [19]

Yagi et al.

[11] Patent Number: 5,459,661
[45] Date of Patent: Oct. 17, 1995

[54] TRACTION CONTROL APPARATUS IN WHICH A DRIVING FORCE IS INCREASED WHEN A STALLING CONDITION IS DETECTED

[75] Inventors: Yoshifumi Yagi, Okazaki; Hirohito Nishikata, Susono; Showichi Miyago; Kiyoyuki Uchida, both of Toyota, all of Japan

[73] Assignee: Toyota Jidosha Kabushiki Kaisha, Toyota, Japan

[21] Appl. No.: 79,313

[22] Filed: Jun. 17, 1993

[30] Foreign Application Priority Data

Jun. 22, 1992 [JP] Japan .................. 4-163124

[51] Int. Cl.$^6$ .................. B60K 41/20; B60B 15/00
[52] U.S. Cl. .................. 364/424.05; 364/426.02; 364/426.03; 303/113.2; 303/141; 180/197
[58] Field of Search .................. 364/426.03, 426.02, 364/424.05; 192/0.032, 1.22; 180/197, 284; 303/103, 93, 94, 112, 113.2

[56] References Cited

U.S. PATENT DOCUMENTS

| | | | |
|---|---|---|---|
| 4,682,667 | 7/1987 | Hosaka | 180/197 |
| 4,792,027 | 12/1988 | Ohkumo | 192/0.032 |
| 4,854,411 | 8/1989 | Ise et al. | 180/197 |
| 4,969,102 | 11/1990 | Tamura et al. | 364/426.03 |
| 5,163,170 | 11/1992 | Grabowski | 318/113 |
| 5,193,888 | 3/1993 | Okazaki et al. | 303/93 |
| 5,224,043 | 6/1993 | Tamura | 364/426.03 |
| 5,248,010 | 9/1993 | Yagi et al. | 180/197 |
| 5,262,952 | 11/1993 | Tsuyama et al. | 364/426.03 |
| 5,297,662 | 3/1994 | Tsuyama et al. | 192/1.22 |

FOREIGN PATENT DOCUMENTS

| | | |
|---|---|---|
| 620506 | 2/1992 | Australia . |
| 0320007 | 6/1989 | European Pat. Off. .................. 28/16 |
| 0457221 | 11/1991 | European Pat. Off. .................. 28/16 |
| 128055 | 7/1985 | Japan . |
| 3-78541 | 4/1991 | Japan . |

*Primary Examiner*—Kevin J. Teska
*Assistant Examiner*—Tan Q. Nguyen
*Attorney, Agent, or Firm*—Kenyon & Kenyon

[57] ABSTRACT

A traction control apparatus provided in an automotive vehicle includes a determining part for determining a slip ratio of driving wheels of the vehicle, a drive torque control part for performing a traction control process in which a driving force of the driving wheels is controlled such that the driving force is lowered to a smaller value when the slip ratio determined by the determining part is greater than a reference value, a detecting part for detecting a stalling condition of the vehicle, and a changing part for changing the traction control process performed by the drive torque control part when a stalling condition is detected by the detecting part, so as to increase the driving force of the driving wheels.

12 Claims, 10 Drawing Sheets

FIG.4A

| TARGET SPEED | CONDITIONS | CALCULATIONS |
|---|---|---|
| $V_{t3}$ | $V_{to} \leq 5\,km/h$ | $V_{to} + K_{NN1}$ |
| | $5\,km/h < V_{to} \leq 40\,km/h$ | $MAX(V_{to} + K_{NN2},\ 5\,km/h + K_{NN1})$ |
| | $40\,km/h < V_{to}$ | $MAX(V_{to} + S \cdot V_{to},\ 40\,km/h + K_{NN2})$ |

FIG. 4B

|  | LOW ROAD FRICTION | HIGH ROAD FRICTION |
|---|---|---|
| $K_{nn1}$ (km/h) | 2.0 | $2.0 + \dfrac{2.0}{0.5} \cdot \mu_0$ |
| $K_{nn2}$ (km/h) | 2.0 | $2.0 + \dfrac{1.5}{0.5} \cdot \mu_0$ |
| S (%) | 2.8 | $2.8 + \dfrac{2.5}{0.5} \cdot \mu_0$ |

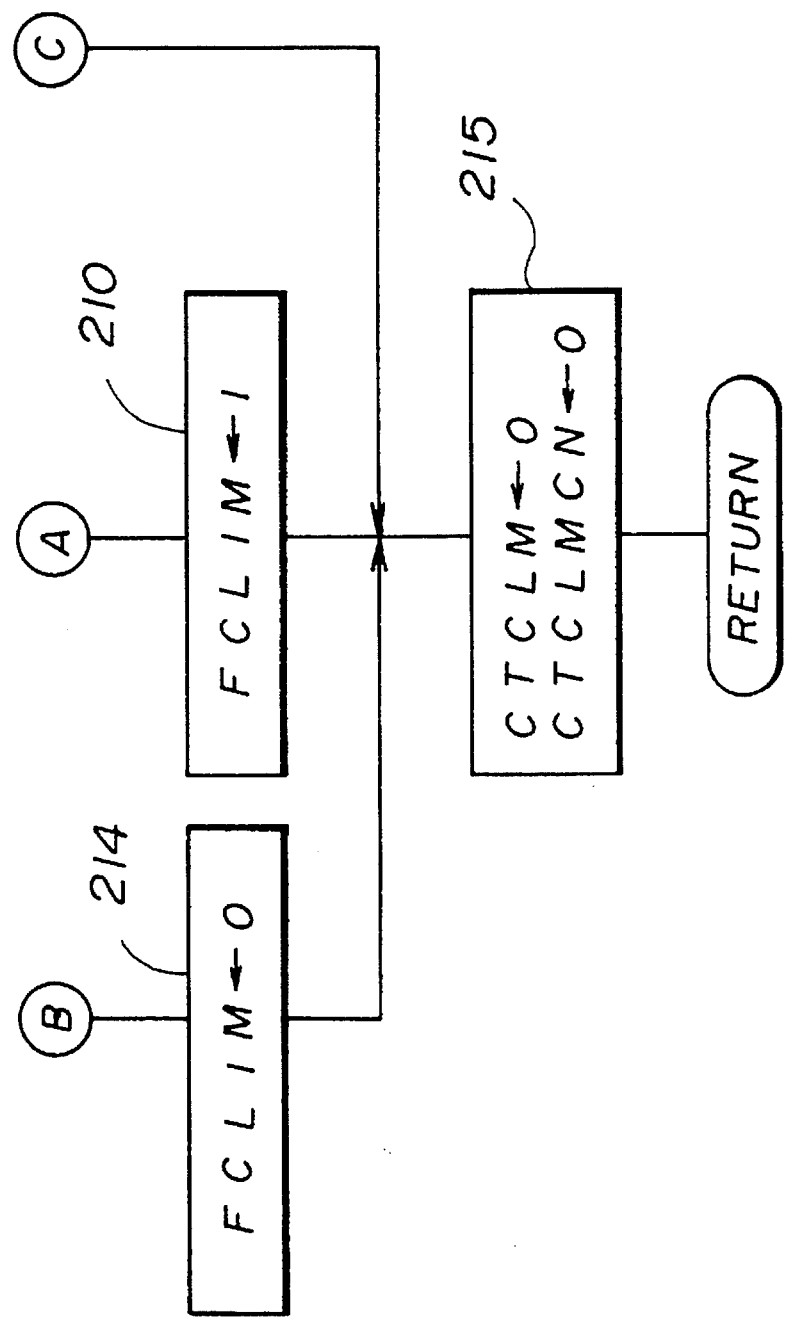

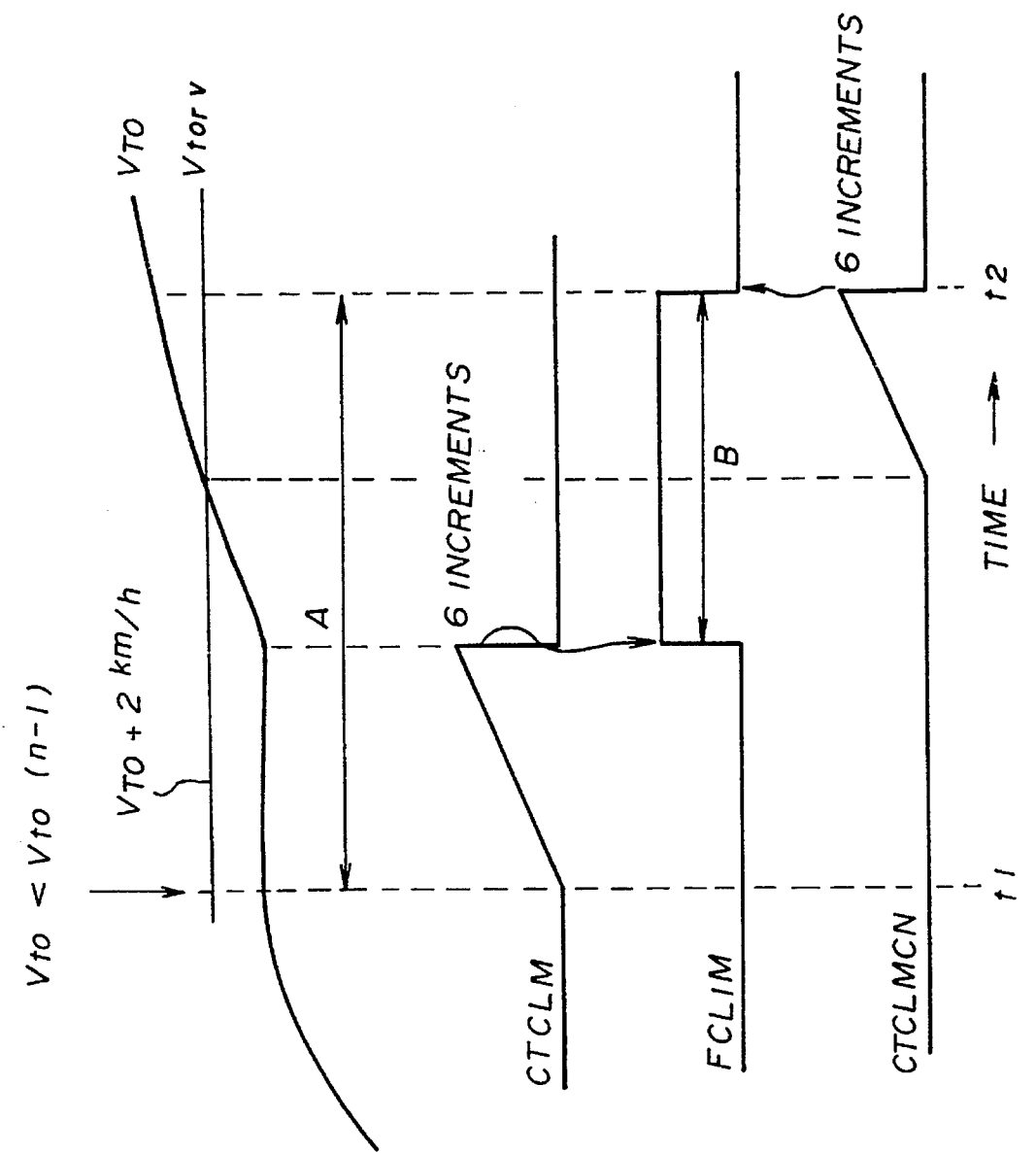

TRACTION CONTROL APPARATUS IN WHICH A DRIVING FORCE IS INCREASED WHEN A STALLING CONDITION IS DETECTED

BACKGROUND OF THE INVENTION (1) Field of the Invention

The present invention relates to a traction control apparatus provided in an automotive vehicle for controlling a driving force on driving wheels due to the output torque of an engine of the automotive vehicle so as to prevent the automotive vehicle from undergoing excessive slippage when the vehicle is accelerating on a snowy road or an uphill road.

(2) Description of the Related Art

When an automotive vehicle is running on a snowy road, it is likely that the driving force transmitted from the engine to the driving wheels of the vehicle is greater than the maximum friction force between the wheels and the road. Since the maximum friction force between the wheels and the snowy road is low, the driving wheels of the vehicle undergo excessive slippage, and the vehicle may stall. On the snowy road, the driving force (acting in a direction of vehicle movement) and the side force (acting in a direction lateral to the vehicle movement) are lowered, and the vehicle acceleration is so low that the vehicle running conditions are unstable.

There is a known traction control device for use in an automotive vehicle. In this traction control device, a traction control process is performed in order to increase vehicle acceleration and straight line stability, thus preventing the driving wheels from undergoing excessive slippage when the vehicle starts running or when the vehicle is accelerating.

Herein, a slip ratio can be defined to be a speed difference between a predetermined target rotational speed and the actual rotational speed of the driving wheels of the vehicle. In the known traction control device, a feedback control process for controlling the output torque of the engine is performed so as to maintain the slip ratio at a value smaller than a prescribed speed difference. Hereinafter, this feedback control process performed to control the output torque of the engine is called the traction control process.

Japanese Laid-Open Patent Publication No.60-128055 discloses a traction control device in which a slip ratio is determined in accordance with a speed difference between the driving wheel speed and the vehicle running speed. However, in this traction control device, the output torque of the engine is controlled based on a deviation of the thus determined slip ratio from a desired value.

When the slip ratio is greater than a desired slip ratio, the output torque of the engine is lowered by the traction control device disclosed in the above mentioned publication. Thus, at this time, the driving force transmitted from the engine to the driving wheels is lowered, and the thus lowered driving force acts on the road in the direction of the vehicle movement.

However, in the above traction control device, during the traction control process, the vehicle may stall when the vehicle is accelerating on a snowy road or an uphill road. The driving force characteristics and the side force characteristics when the slip ratio varies are different from each other. The slip ratio is determined in the above traction control device by giving a consideration to the balance of the driving force and the side force. If it is detected that the slip ratio is greater than the desired slip ratio, the driving force is lowered. However, when the vehicle is running on an uphill road, the gravity force may be greater than the driving force. When the vehicle is running on a snowy road, the snow resistance may be greater than the driving force. Thus, in a case in which the driving force is lowered in response to a great slippage, the vehicle may undergo a sudden loss of engine power due to slippage on the snowy or uphill road.

SUMMARY OF THE INVENTION

Accordingly, it is a general object of the present invention to provide an improved traction control apparatus in which the above described problems are eliminated.

Another, more specific object of the present invention is to provide a traction control apparatus in which a reference value used to perform a traction control process is changed when a stalling condition is detected during execution of the traction control process, so as to increase the driving force of the driving wheels, thus preventing the vehicle from stalling during the traction control process.

The above mentioned objects of the present invention are achieved by a traction control apparatus which includes a determining part for determining a slip ratio of driving wheels of a vehicle, a drive torque control part for performing a traction control process in which a driving force of the driving wheels is controlled such that the driving force is lowered when the slip ratio determined by the determining part is greater than a reference value, a detecting part for detecting a stalling condition of the vehicle, and a changing part for changing the traction control process performed by the drive torque control part when a stalling condition is detected by the detecting part, so as to increase the driving force of the driving wheels.

In the traction control apparatus according to the present invention, a target speed of the driving wheels is increased when a stalling condition is detected, so as to increase the driving force of the driving wheels. Thus, when the vehicle is running or accelerating on a snowy or uphill road, the occurrence of a stall of the vehicle during the traction control process can be eliminated. It is possible for the traction control apparatus to stably and safely control the driving force of the driving wheels.

Other objects and further features of the present invention will become more apparent from the following detailed description when read in conjunction with the accompanying drawings.

BRIEF DESCRIPTION OF THE DRAWINGS

FIGS.4A and 4B are charts showing conditions and calculations used to determine a target speed of the driving wheels during the traction control process;

FIGS.6A and 6B are a flowchart for explaining a stall detection process performed by the microcomputer of the automotive vehicle shown in FIG.2; and FIGS.7A through 7D are timing charts for explaining the effects of the stall detecting process shown in FIGS.6A and 6B.

DESCRIPTION OF THE PREFERRED EMBODIMENT

Figure 1:
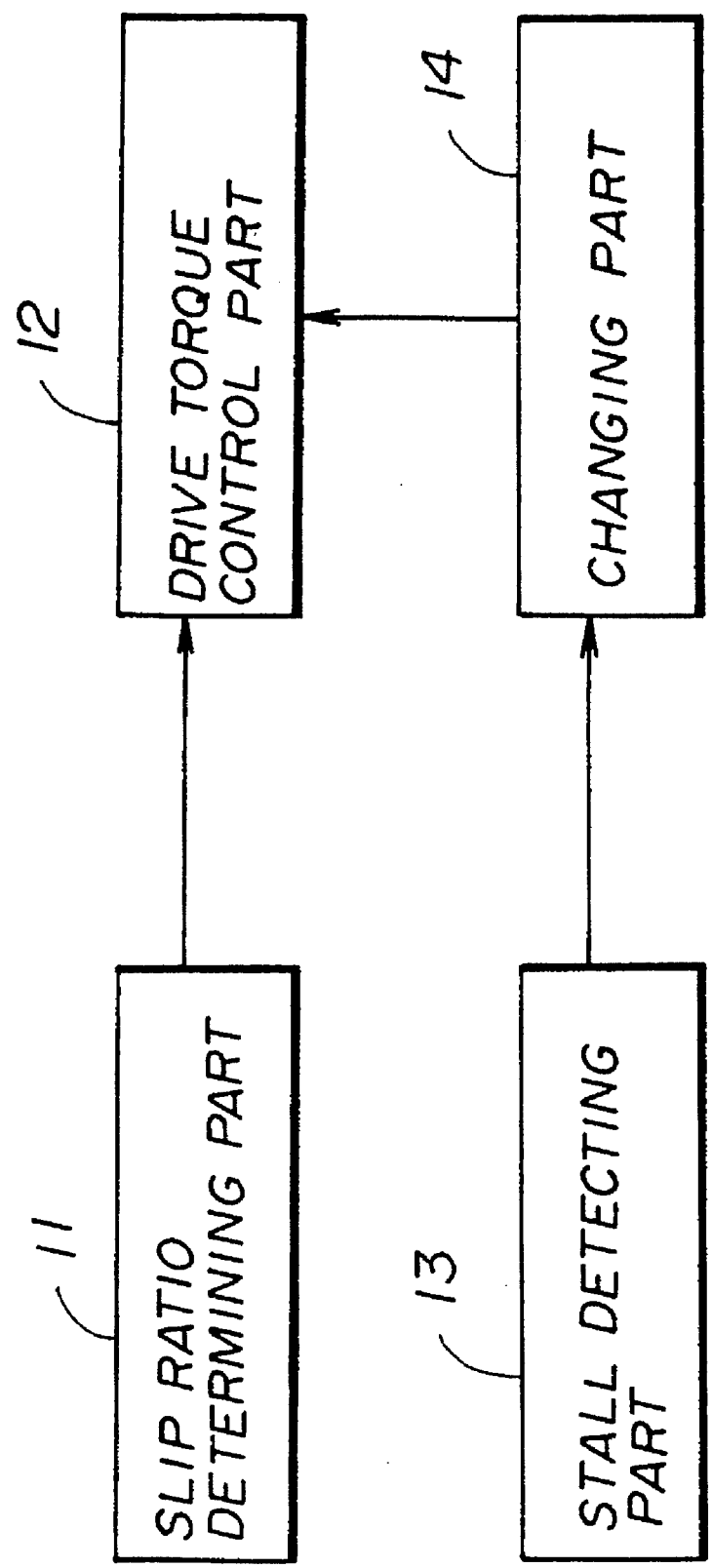
FIG.1 is a block diagram showing a traction control apparatus according to the present invention.

A description will now be given of a traction control apparatus according to the present invention. FIG.1 shows this traction control apparatus. In the traction control apparatus shown in FIG.1, a slip ratio determining part 11, a drive torque control part 12, a stall detecting part 13, and a changing part 14 are provided.

The slip ratio determining part 11 determines a slip ratio of driving wheels of a vehicle. The drive torque control part 12 controls a driving force of the driving wheels such that the driving force is lowered to a smaller value when the slip ratio determined by the determining part 11 is greater than a reference value. The detecting part 13 detects a stalling condition of the vehicle. The changing part 14 changes the reference value of the drive torque control part 12 when a stalling condition is detected by the detecting part 13, so that the driving force of the driving wheels is increased due to the thus changed reference value.

Figure 2:
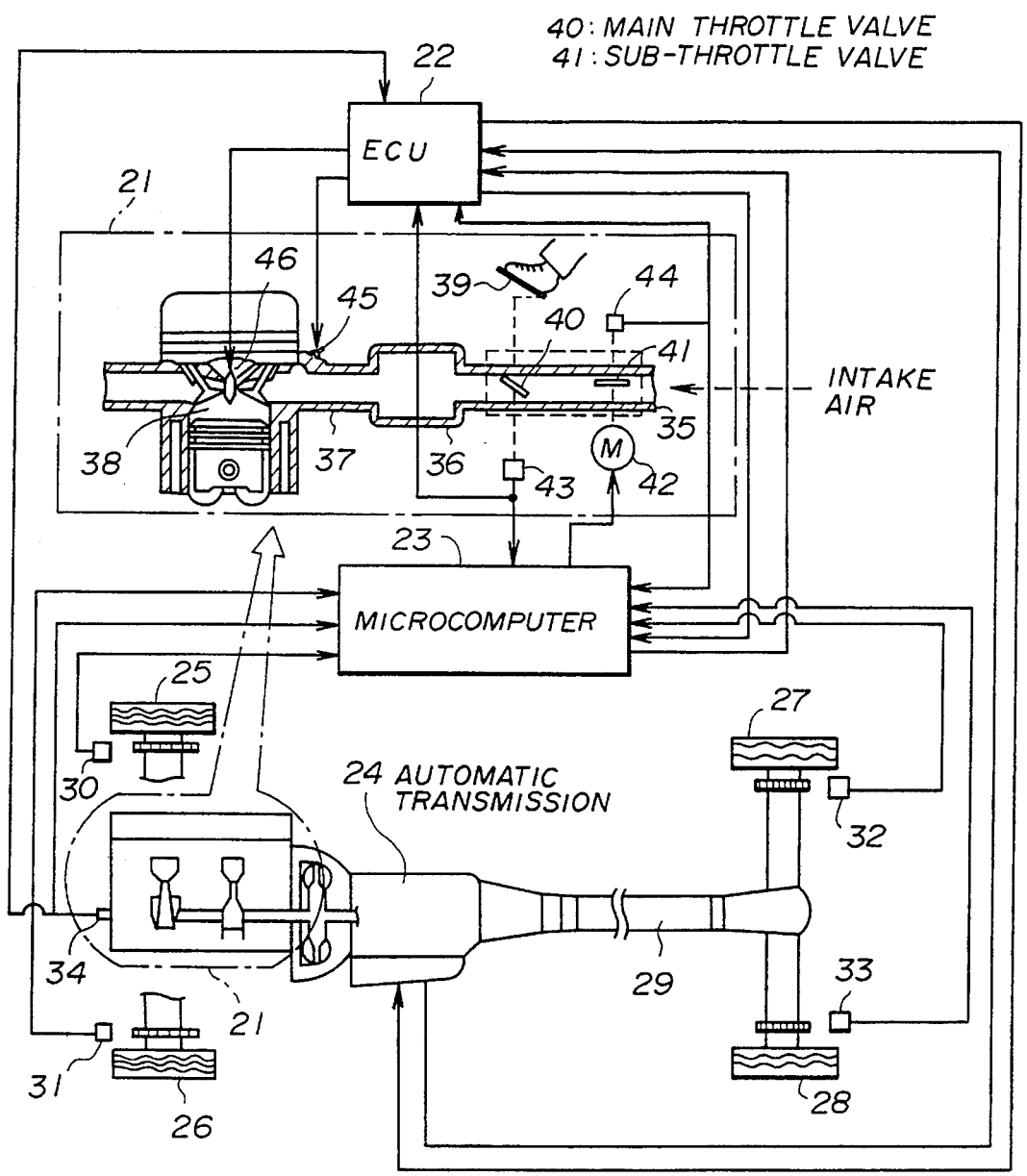
FIG.2 is a system diagram showing an automotive vehicle to which an embodiment of the traction control apparatus according to the present invention is applied.

Next, a description will be given of an automotive vehicle to which a preferred embodiment of the traction control apparatus according to the present invention is applied. FIG.2 shows a rear-wheel-driven automotive vehicle 20 with an engine 21, an electronic control unit (ECU) 22, a microcomputer 23, and an automatic transmission 24. The automotive vehicle 20 has front wheels 25 and 26 which are driven-side wheels, and rear wheels 27 and 28 which are driving-side wheels. An output shaft of the engine 21 is coupled to a torque converter of the automatic transmission 24, and a driving power of the engine 21 is transmitted from the automatic transmission 24 to the rear wheels 27 and 28 via a drive shaft 29 so that the vehicle 20 is propelled and moved with the driving force of the rear wheels 27 and 28.

In the automotive vehicle 20 shown in FIG.2, wheel speed sensors 30 and 31 are provided at the front wheels 25 and 26 so as to sense the rotational speed of each of the front wheels, and wheel speed sensors 32 and 33 are provided at the rear wheels 27 and 28 so as to sense the rotational speed of the rear wheels. An engine speed sensor 34 is provided within the engine 21 to sense the rotational speed of the crankshaft of the engine 21. This rotational speed is called an engine speed. A signal indicating the engine speed being sensed is supplied from the engine speed sensor 34 to both the ECU 22 and the microcomputer 23. Signals indicating the wheel speeds sensed by the wheel speed sensors 30–33 are supplied to the microcomputer 23.

An intake pipe 35, a surge tank 36, and an intake manifold 37 communicate with a combustion chamber 38 of the engine 21 so as to feed intake air into the engine 21 in a direction indicated by an arrow in FIG.2. In the intake pipe 35, a main throttle valve 40 and a sub-throttle valve 41 upstream from the main throttle valve 40 are provided. A throttle position (or a throttle opening) of the main throttle valve 40 is adjusted in response to the position of an accelerator pedal 39 set by a vehicle operator, in order to control the flow rate of intake air. Independently from the operation of the main throttle valve 40, a throttle position of the sub-throttle valve 41 is adjusted by a throttle valve actuator 42 such as a stepping motor. The operation of the throttle valve actuator 42 is controlled by a signal output by the microcomputer 23.

As shown in FIG.2, a throttle position sensor 43 is mounted to sense the throttle position of the main throttle valve 40, and outputs a signal indicating the throttle position to both the ECU 22 and the microcomputer 23. A throttle position sensor 44 is also mounted to sense the throttle position of the sub-throttle valve 41, and outputs a signal indicating the throttle position to both the ECU 22 and the microcomputer 23.

The ECU 22 is made up of a digital computer, and carries out a fuel injection control process and an ignition timing control process. A fuel injection valve 45 is provided in the intake manifold 37 so as to inject fuel into the combustion chamber 38 during an injection time. In order to determine this injection time, the fuel injection control process is carried out by the ECU 22 in accordance with the signals supplied from the engine speed sensor 34, the throttle position sensors 43, 44, and other sensors (not shown in FIG.2). A spark plug 46 is provided in the combustion chamber 38. In order to determine an ignition timing of the spark plug 46, the ignition timing control process is carried out by the ECU 22 in accordance with the signals supplied from the above mentioned sensors.

In addition, the ECU 22 carries out a shifting control process in accordance with the throttle position signal supplied from the main throttle sensor 43, a signal indicating the current shift position supplied from the automatic transmission 24, a signal indicating the vehicle speed supplied from a vehicle speed sensor (not shown), and a prescribed control signal supplied from the microcomputer 23. This shifting control process is carried out in order to set a shift position of the automatic transmission 24 which position is appropriate for the vehicle running conditions.

A traction control process according to the present invention is carried out by the microcomputer 23. The engine speed signal supplied from the engine speed sensor 34, the wheel speed signals supplied from the wheel speed sensors 30–33, and the throttle position signals supplied from the throttle position sensors 43–44 are input to the microcomputer 23. In accordance with these input signals, the microcomputer 23 carries out a drive torque control process for controlling the drive torque of the engine 21. The microcomputer 23 controls the operation of the throttle valve actuator 42 based on the result of the drive torque control process, so that the throttle position of the sub-throttle valve 41 is adjusted, thus controlling the drive torque of the engine 21. Signals supplied from the microcomputer 23 to the ECU 22 include: a TRC signal indicating whether the traction control process is being performed, a fuel cut signal indicating the fuel cut of the fuel injection valve 45, and an ignition timing delay signal indicating the delay of ignition timing of the spark plug 46.

In the case of the automotive vehicle 20 shown in FIG.2, the drive torque of the engine 21 during the traction control process is controlled by setting a throttle position of the sub-throttle valve 41 to an appropriate position in accordance with the slipping conditions of the driving wheels. Also, the throttle position Ts of the sub-throttle valve 41 is determined in accordance with a slip ratio dV of the rear wheels 27 and 28 (the driving wheels), as follows.

$$Ts(n) = Ts(n-1) + (dTs/dt) \, To \tag{1}$$

$$(dTs/dt) = K1 \, dV + K2 \, dG \tag{2}$$

In the above formula (1): "Ts(n)" denotes the throttle position of the sub-throttle valve 41 to be determined; "Ts(n−1)" denotes the previous throttle position of the sub-throttle valve 41 being previously set; and "To" denotes a period on which the traction control process is repeatedly performed. In the above formula (2): "K1", "K2" and "K3" are coefficients having positive values; "dV" denotes a speed difference between a target driving wheel speed Vt3 (determined based on a vehicle speed or driven wheel speed) and the actual driving wheel speed Vd; and "dG" denotes a difference between the changing rate of the vehicle speed Vto and the changing rate of the driving wheel speed Vd. In this embodiment, the slip ratio of the driving wheels determined by the determining part 11 is defined to be the speed difference dV (=Vt3−Vd). The difference "dG" is indicated by its absolute value as in the formula: dG=|(dVto/dt)−(dVd/dt)|.

Figure 3A:
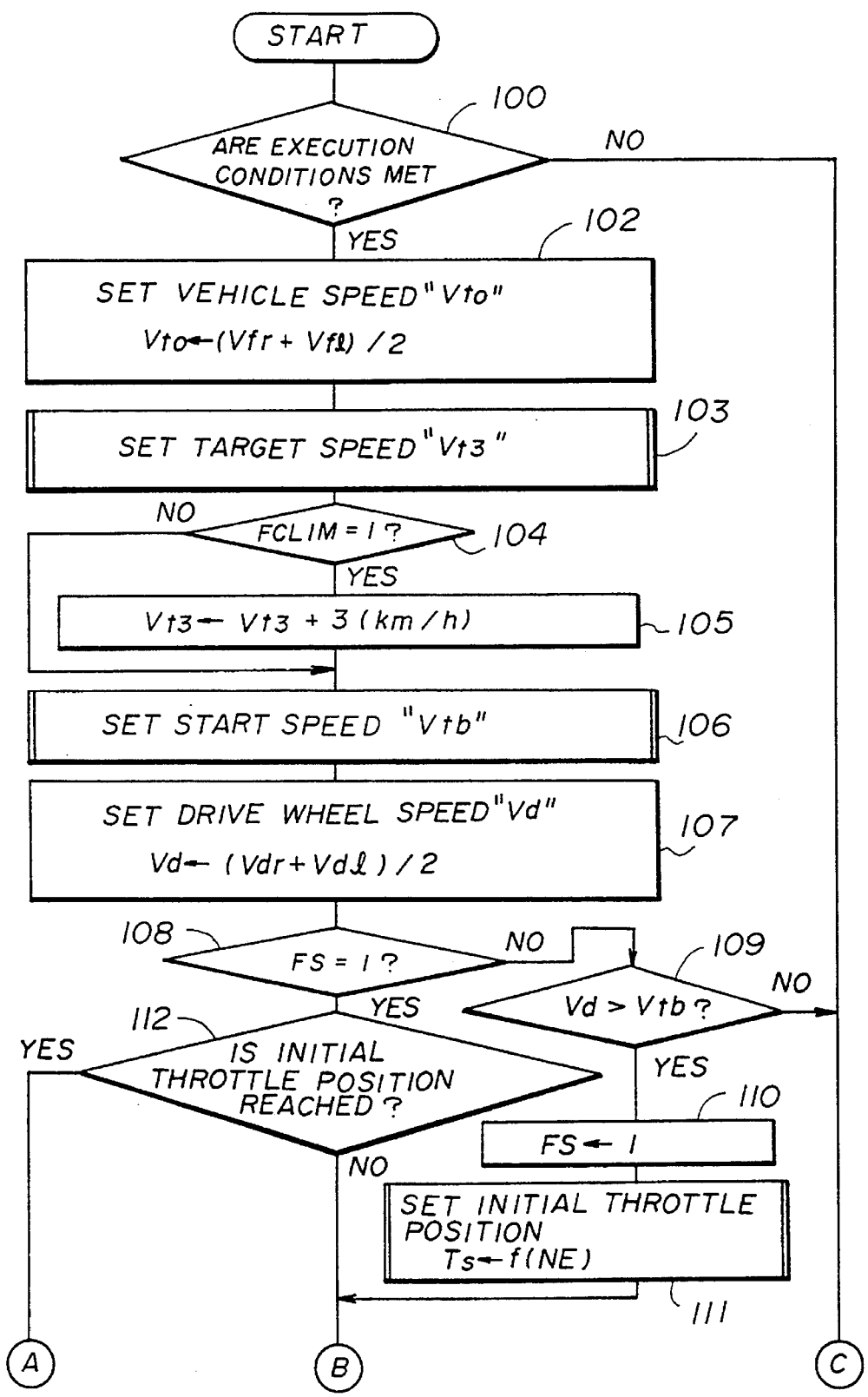
FIGS.3A and 3B are a flowchart for explaining a traction control process performed by a microcomputer of the automotive vehicle shown in FIG.2.
Figure 3B:
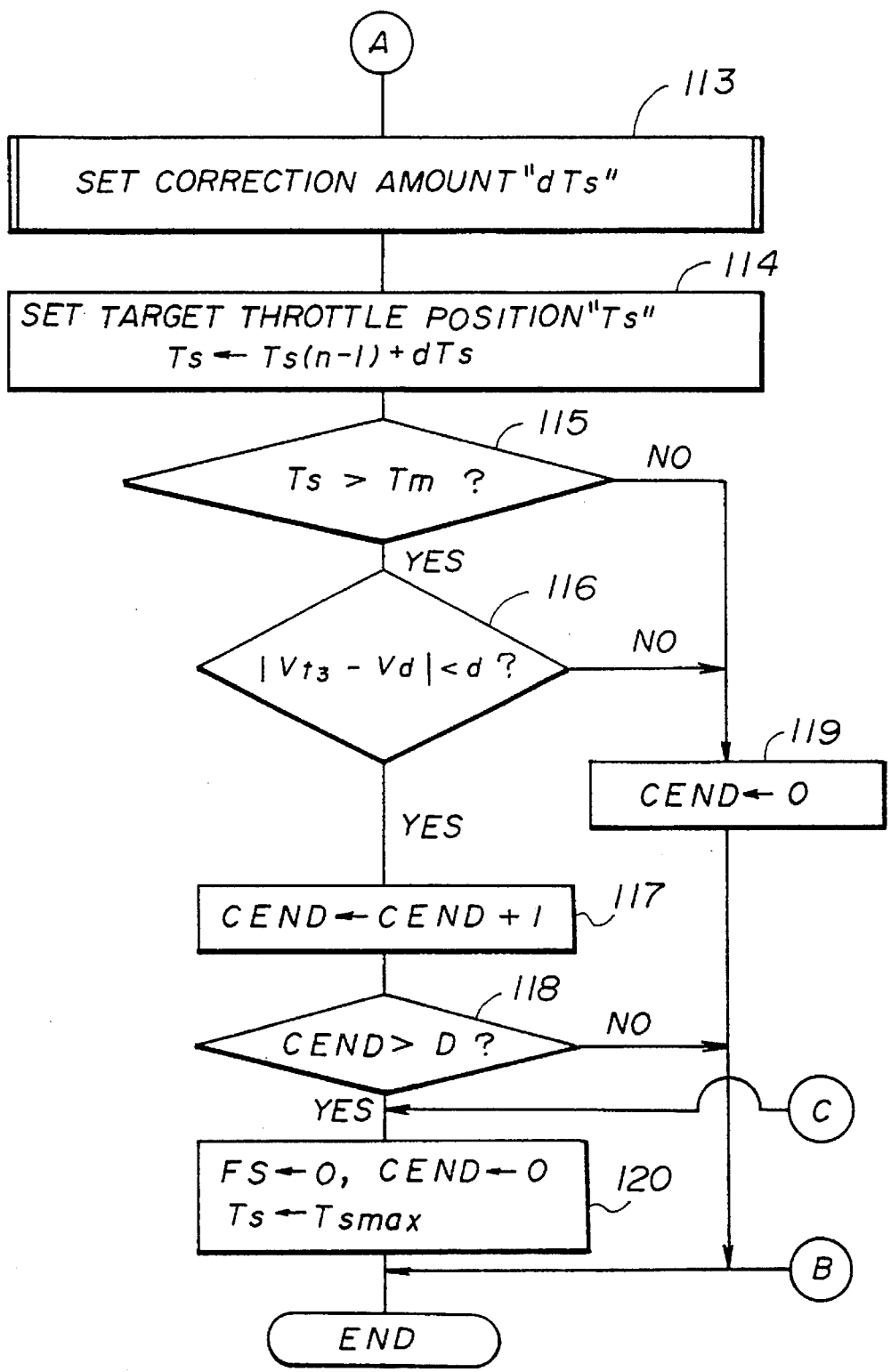

Next, a description will be given of a traction control process performed by the traction control apparatus according to the present invention. FIGS.3A and 3B show the traction control process. This process is repeatedly performed by the microcomputer 23 every 12 ms (milliseconds). By performing the traction control process shown in FIGS.3A and 3B, the functions of the slip rate determining part 11, the drive torque control part 12 and the changing part 14 according to the present invention are achieved.

In the traction control process shown in FIG.3A, step 100 detects whether or not the execution conditions for starting the traction control process are satisfied. The execution conditions include: 1) the throttle position Tm of the main throttle valve 40 is not at its fully-closed position, and 2) none of the above mentioned sensors are malfunctioning. If any of the execution conditions are not satisfied, step 120 shown in FIG.3B is performed and the traction control process ends. In step 120, flags FS and CEND (which will be described below) are reset to zero and the throttle position Ts of the sub-throttle valve 41 is set to a maximum throttle position Tsmax. The maximum throttle position Tsmax indicates a fully-open throttle position of the sub-throttle valve 41.

If the execution conditions are satisfied in step 100, the reading of speed parameters from the sensors and the associated calculations are performed in steps 102–107.

Step 102 sets a vehicle speed Vto by taking the average of a right-hand front wheel speed Vfr and a left-hand front wheel speed Vfl: Vto=(Vfr+Vfl)/2. The driven-wheel speeds Vfr and Vfl are indicated by the signals output by the sensors 30 and 31.

Step 103 sets a target speed Vt3 of the rear wheels 27 and 28 (the driving wheels) based on the value of the vehicle speed Vto set in step 102.

The target speed Vt3 is calculated in accordance with the conditions and calculations indicated in FIG.4A:

1) when Vto≦5 km/h, Vt3=(Vto+Knn1) km/h
2) when 5 km/h<Vto<40 km/h, Vt3 is set to the greater one of (Vto+Knn2) and (5 km/h+Knn1)
3) when Vto>40 km/h, Vt3 is set to the greater one of (Vto+S Vto) and (40 km/h+Knn2), where Knn1 and Knn2 are coefficients, and S denotes a target slip ratio.

The coefficients Knn1 and Knn2 and the target slip ratio S are set to values indicated in FIG.4B. The values being set are either one of two different values: one value used when the friction force between the wheel and the road is relatively low, and the other used when the road friction force is relatively high. A coefficient ""o" at the right-hand column of the chart in FIG.4B is predetermined in accordance with the friction force (μ):

$$\mu=[(mf+mr)/mr]a/gm \quad (3)$$

where "mf" is the weight of the front wheels 25 and 26, "mr" is the weight of the rear wheels 27 and 28, "a" is the vehicle acceleration, and "gm" is the acceleration due to gravity. The vehicle acceleration "a" in the above equation (3) is calculated from the changing rate of the rotational speeds Vfl and Vfr of the front wheels 25 and 26 indicated by the output signals of the sensors 30 and 31. Alternatively, the vehicle acceleration "a" is set to the value indicated by a signal output by an acceleration sensor (not shown).

It should be noted that the target speed Vt3 of the driving wheels is set, in step 103, so as to be greater than the vehicle speed Vto of the driven wheels, thus the vehicle 20 undergoes a desired slippage. It is readily understood that when the vehicle speed Vto is low the target slip ratio S (=(Vt3−Vto)/Vto) has a relatively large value, ensuring increased vehicle acceleration. Also, when the vehicle speed Vto is high, the target slip ratio S has a relatively small value, and the preferential traction control is given to the side force, rather than the driving force, thus ensuring increased straight line stability of the vehicle. The target speed Vt3 determined in step 103 has a value substantially indicating the value of a slip ratio of the driving wheels, and the function of the determining part 11 is achieved by performing step 103.

After step 103 is performed, step 104 detects whether or not a stall detection flag FCLIM (which will be described below) is equal to 1. If FCLIM=1, step 105 is performed. In step 105, the target speed Vt3 is increased to a value indicating the target speed Vt3 to which 3 km/h (kilometer per hour) is added (Vt3←Vt3+3 (km/h)). If FCLIM is not equal to 1, step 106 is performed without performing step 105. The function of the changing part 14 according to the present invention is achieved by performing the above step 105.

Step 106 sets a start speed Vtb at which the performing of the traction control process is started. The start speed Vtb is determined in accordance with the equation:

$$Vtb=Vt3+B \text{ (where B is a given coefficient)} \quad (4)$$

For the sake of simplicity, the coefficient B is preset to a value dependent on the vehicle speed and the road condition. In step 106, the start speed Vtb is set to a value that is greater than the target speed Vt3, in order to avoid performing too frequently the traction control process.

After step 106 is performed, step 107 sets a driving wheel speed Vd by taking the average of a right-hand rear wheel speed Vdr and a left-hand rear wheel speed Vdl (Vd=(Vdr+Vdl)/2). These rear wheel speeds Vdr and Vdl are indicated by the output signals of the wheel speed sensors 32 and 33. Step 108 detects whether or not the value of a TRC (traction control) execution flag FS is equal to 1. Initially, the TRC execution flag FS is set to 0, and the answer to step 108 is negative. If FS=0, step 109 is performed. If FS=1, step 112 is performed.

Step 109 detects whether or not the driving wheel speed Vd is greater than the start speed Vtb. If Vd≦Vtb, the driving wheel speed Vd does not reach the start speed Vtb at which the traction control process is started. Then, the step 120 shown in FIG.3B is performed to reset both the flags FS and CEND to zero and set the throttle position Ts of the sub-throttle valve 41 to the maximum throttle position Tsmax.

If the answer to step 109 is affirmative (Vd>Vtb), the driving wheel speed Vd does reach the start speed Vtb at which the performing of the traction control process is started. Steps 110 and 111 are performed, and then the traction control process ends. Step 110 sets the TRC execution flag FS to 1 (FS←1). Step 111 sets the throttle position Ts of the sub-throttle valve 41 to an initial throttle position f(NE) (Ts←f(NE)).

The initial throttle position f(NE) of the sub-throttle valve 41 is a value determined in accordance with the road condition and the engine speed NE indicated by the output signal of the engine speed sensor 34. The sub-throttle valve 41 is always set to the fully-open throttle position while the traction control process is not being performed. If the traction control process is started with the sub-throttle valve 41 set at the fully-open throttle position, a certain time is needed for the sensitivity to the change in the throttle position of the sub-throttle valve 41 becoming appreciable. In order to obtain a reasonable sensitivity immediately when the traction control process is started, the sub-throttle valve 41 is set to the initial throttle position f(NE) in step 111.

If the TRC execution flag FS is previously set to 1 in steps 109–111, the answer to step 108 is affirmative (FS=1), and then step 112 is performed. Step 112 detects whether or not the throttle position of the sub-throttle valve 41 indicated by a signal supplied from the throttle position sensor 44 reaches the initial throttle position Ts (=f(NE)) previously set in step 111. If the answer to step 112 is negative, the traction control process ends without performing other steps.

Thus, a feedback control procedure (steps 113–119 shown in FIG.3B) in which the throttle position Ts of the sub-throttle valve 41 is adjusted to a target throttle position is started after the initial throttle position f(NE) is reached. If the feedback control procedure is performed before the initial throttle position is reached, the throttle position will be adjusted to an excessive value. In order to avoid this, step 112 is performed.

If the answer to step 112 is affirmative, steps 113–119 shown in FIG.3B are performed. Step 113 sets a correction amount dTs used to determine a target throttle position Ts of the sub-throttle valve 41. Step 114 sets a target throttle position Ts of the sub-throttle valve 41 based on the previous target throttle position Ts(n−1) and the correction amount dTs, both stored in a memory of the microcomputer 23. The target throttle position Ts is determined in accordance with the equation (1). A signal indicating the target throttle position Ts is supplied from the microcomputer 23 to the throttle valve actuator 42 to control the operation of the sub-throttle valve 41.

The flag FS is reset to zero after it is confirmed that the traction control end conditions of steps 115, 116 and 118 are satisfied. Step 115 detects whether or not the throttle position Ts of the sub-throttle valve 41 is greater than a throttle position Tm of the main throttle valve 40. If the answer to step 115 is negative, step 119 is performed, and then the traction control process ends. Step 119 resets a time counter CEND to zero.

If the answer to step 115 is affirmative, step 116 is performed. Step 116 detects whether or not the absolute value of the speed difference (Vt3−Vd) (which is defined to be the slip rate) is less than a prescribed value "d". If the answer to step 116 is negative, step 119 is performed. If the answer to step 116 is affirmative, step 117 is performed. Step 117 increments the time counter CEND (CEND←CEND+1).

After step 117 is performed, step 118 detects whether or not the time counter CEND is greater than a prescribed time D. If the time counter CEND is greater than the prescribed time D, it is judged that all the traction control end conditions are satisfied. Then, the above step 120 is performed, and the traction control process ends. If the answer to step 118 is negative, the traction control process ends without performing other steps. The value d in step 116 and the time D in step 118 vary depending on the type of the vehicle to which the traction control apparatus according to the present invention is applied.

The function of the drive torque control part 12 according to the present invention is achieved by performing steps 108–119 by means of the microcomputer 23 together with the sub-throttle valve 41 and the throttle valve actuator 40.

A TRC signal indicating the value of the TRC execution flag FS being set in step 110 of the traction control process is supplied from the microcomputer 23 to the ECU 22 by a transmission unit (not shown).

Figure 5:
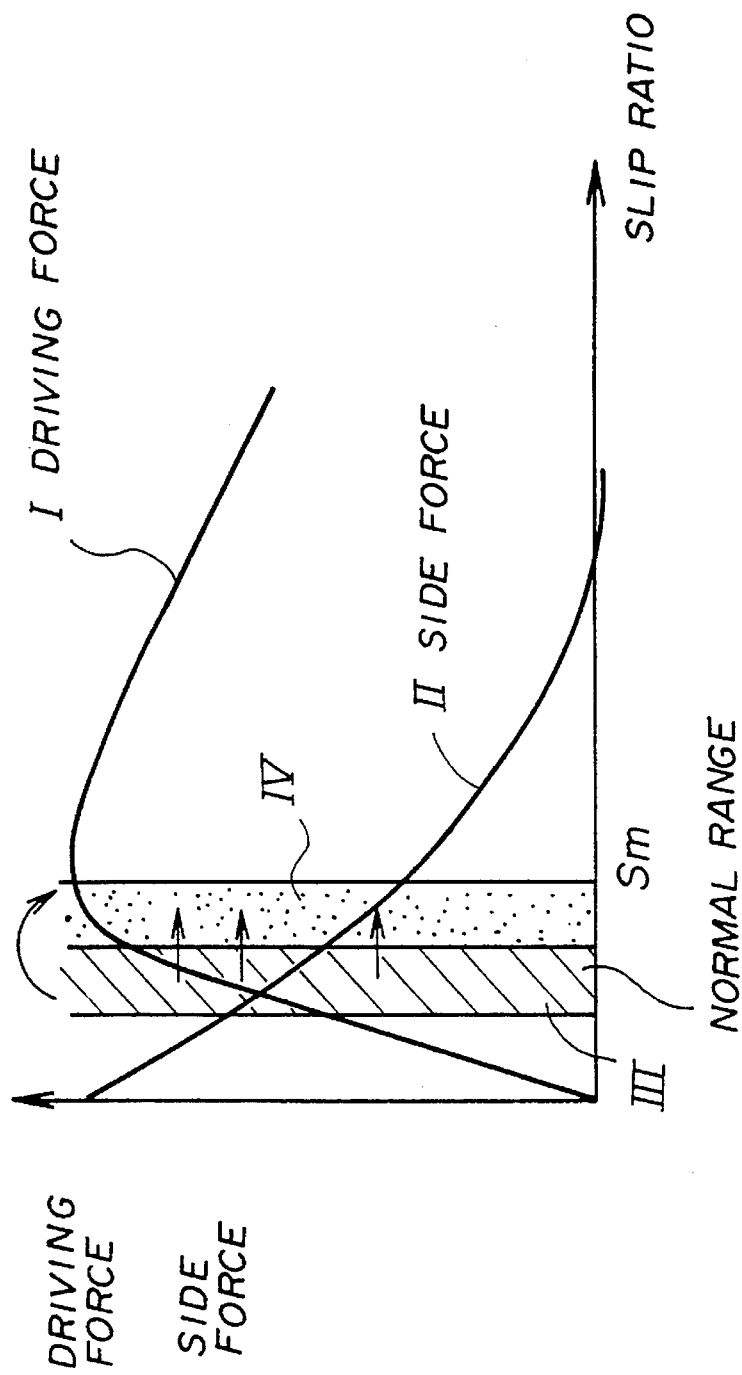
FIG.5 is a diagram showing the driving force characteristics and the side force characteristics when the slip ratio varies.

FIG.5 shows the driving force characteristics indicated by a curve I and the side force characteristics indicated by a curve II when the slip ratio varies. Generally, the driving force has a peak when the slip ratio is equal to a certain value Sm, the driving force increasing when the slip ratio is smaller than the value Sm, and the driving force decreasing when the slip ratio is greater than the value Sm. The side force is decreasing when the slip ratio is increasing.

The traction control process described above is performed by giving a consideration to the balance of the driving force and the side force. In other words, a feedback control procedure in which the throttle position of the sub-throttle valve 41 is adjusted to a target throttle position is performed in a manner such that the slip ratio is within a normal range indicated by III in FIG.5. The target speed Vt3 of the driving wheels is determined in step 103. However, if the throttle position corresponding to the target speed Vt3 is set to the sub-throttle valve 41, it is likely that the vehicle will stall when the vehicle is running on a snowy road or uphill road, as previously described.

According to the embodiment of the present invention, a stall detection process is repeatedly performed by the microcomputer 23. When a stalling condition is detected in the stall detection process, the target speed Vt3 of the driving wheels is changed by performing steps 104 and 105 of the traction control process shown in FIG.3A so as to increase the driving force.

Figure 6A:
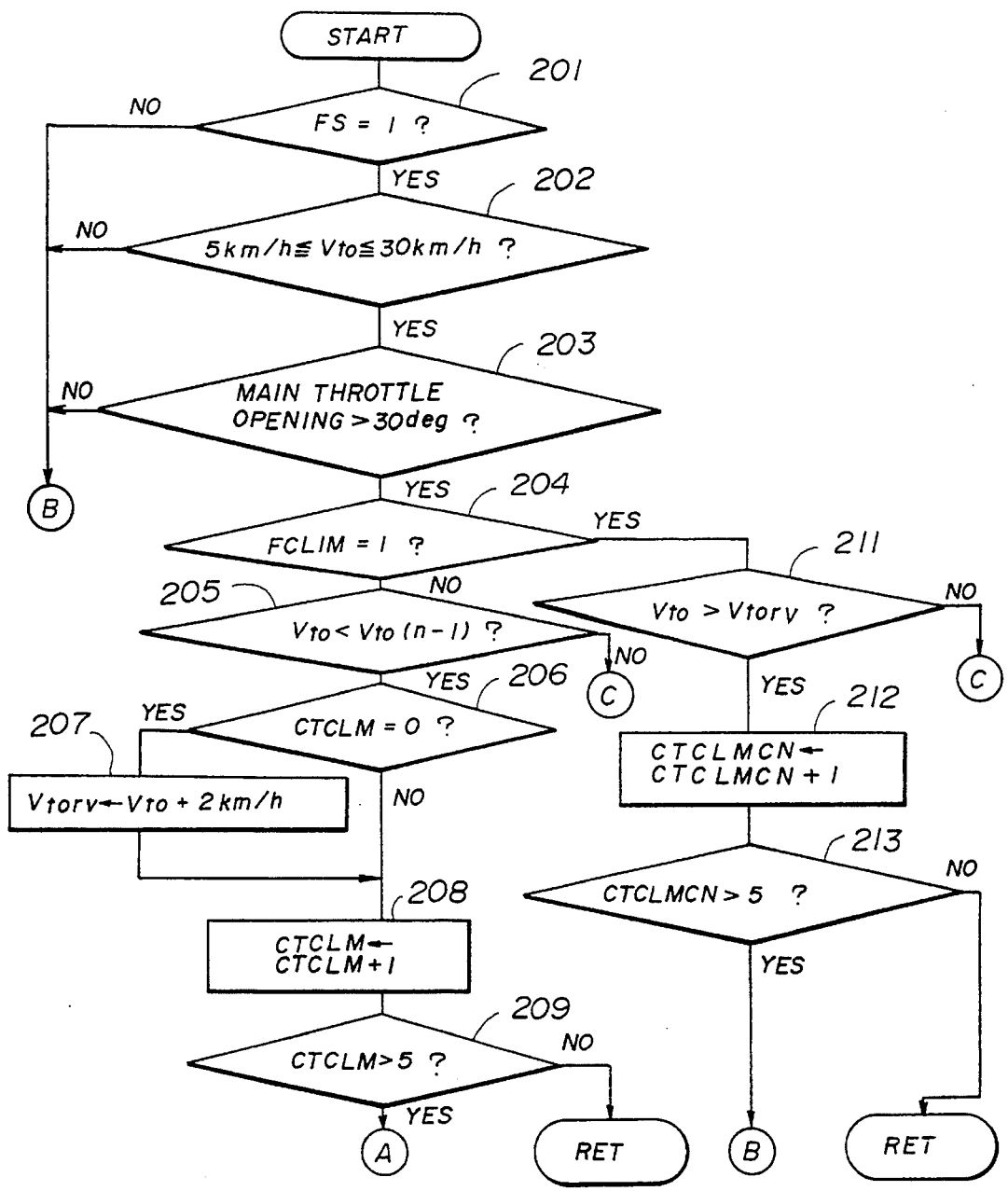

Next, a description will be given of a stall detection process performed by the traction control apparatus according to the present invention. FIGS.6A and 6B show the stall detection process. The stall detection process is repeatedly performed by the microcomputer 23 every 48 ms (milliseconds). By performing the stall detection process shown in FIGS.6A and 6B, the function of the stall detecting part 13 according to the present invention is achieved.

In the process shown in FIG.6A, step 201 detects whether or not the TRC execution flag FS is equal to 1. When the flag FS is equal to 1, it indicates that the traction control process is being performed. When the flag FS is equal to 0, it indicates that the traction control process is not being performed. If FS=1, step 202 is performed. Step 202 detects whether or not the vehicle speed Vto is greater than 5 km/h and smaller than 30 km/h. Only when the vehicle speed Vto is within this range, the stall detection process is performed.

If the answer to step 202 is affirmative, step 203 detects whether or not the throttle position of the main throttle valve 40 which is responsive to the position of the accelerator pedal 39 is greater than the value of 30 degrees. In this step, it is judged whether the vehicle operator intends to accelerate the vehicle.

When all the three conditions of the above steps 201–203 are satisfied, subsequent steps are performed to carry out the stall detecting procedure according to the present invention. When any of these conditions is not satisfied, step 214 shown in FIG.6B is performed without performing the subsequent steps. Step 214 resets the detection flag FCLIM to 0. After step 214 is performed, step 215 is performed and the stall detecting process ends.

Initially, the detection flag FCLIM is set to zero. When it is judged that a stalling condition occurs, the detection flag FCLIM is set to 1 in the stall detection process. Conversely, when it is judged that the vehicle is not stalling, the detection flag FCLIM is set to zero.

Step 215 resets both a detection counter CTCLM and a cancellation counter CTCLMCN to 0, and then the stall detecting process ends.

FIG.7A shows the changes of the vehicle speed Vto when the stall detecting process is being performed. For the sake of convenience, it is assumed that the required conditions of steps 201–203 are satisfied during a time period between t1 and t2 indicated by an arrow "A" in FIG.7A. At the time point t1, step 205 detects that the vehicle speed Vto sensed by the sensors 30–31 is smaller than the previous vehicle speed Vto(n−1) stored in the memory of the microcomputer 23. Then, step 208 increments the detection counter CTCLM each time the stall detecting process is performed.

The detection flag FCLIM is initially set to 0, and the answer to step 204 is negative. If the answer to step 204 is negative, step 205 detects whether or not the current vehicle speed Vto sensed by the sensors 30–31 is smaller than the previous vehicle speed Vto(n−1) being previously set and stored in the memory. When Vto≧Vto(n−1), it is judged that the vehicle is not stalling. Step 215 resets both the detection counter CTCLM and CTCLMCN to zero, and the stall detecting process ends. When Vto<Vto(n−1), it is judged that the vehicle is possibly stalling. Step 206 is performed to detect whether or not the detection counter CTCLM is equal to zero.

Initially, the detection counter CTCLM is set to 0, and the answer to step 206 is affirmative. After step 206 is initially performed, step 207 is performed to set a reference vehicle speed Vtorv by adding a given speed value (equal to 2 km/h) to the currently set vehicle speed Vto (Vtorv←Vto+2 km/h). The stall detection is performed by comparing the vehicle speed Vto with the reference vehicle speed Vtorv. Since the vehicle is accelerating, the reference vehicle speed Vtorv is increased to a value greater than the vehicle speed Vto by the given value (=2 km/h).

Step 208 increments the detection counter CTCLM (CTCLM←CTCLM+1). Step 209 detects whether or not the value of the detection counter CTCLM is greater than 5. If CTCLM>5, the vehicle operating condition in which the answer to step 205 is affirmative continues for a time period of 288 ms (=48 ms×6). Thus, it is judged that a stalling condition of the vehicle occurs, steps 210 and 215 shown in FIG.6B are performed, and then the stall detecting process ends. Step 210 sets the detection flag FCLIM to the value one (FCLIM←1). In the above step 215, the detection counter CTCLM and the cancellation counter CTCLMCN are reset to 0. If CTCLM≦5 in step 209, the stall detecting process ends without performing other steps. FIG.7B shows the changes of the value of the detection counter CTCLM when the stall detecting process described above is being performed.

After the previous stall detecting process in which the detection flag FCLIM is set to 1 ends, the stall detecting process re-starts. Similarly, steps 201–203 are performed, and then step 204 detects that the value of the detection flag FCLIM is equal to 1. If the answer to step 204 is affirmative, subsequent steps 211–213 are performed so as to cancel the performance of the stall detecting process. Step 211 detects whether or not the vehicle speed Vto is greater than the reference vehicle speed Vtorv being previously set in step 207. If the answer to step 211 is negative (Vto≦Vtorv), the above step 215 is performed, and then the stall detecting process ends. If the answer to step 211 is affirmative (Vto>Vtorv), it is judged that the vehicle is recovering from the stalling condition to the normal condition. Step 212 increments the cancellation counter CTCLMCN (CTCLMCN←CTCLMCN+1).

After step 212 is performed, step 213 detects whether or not the value of the cancellation counter CTCLMCN is greater than 5. If the answer to step 213 is negative (CTCLMCN≦5), the stall detecting process ends without performing other steps. If the answer to step 213 is affirmative (CTCLMCN=6), the vehicle operating condition in which the requirement conditions of steps 201–204 and 211 are satisfied continues for a time period of 288 ms. Thus, it is judged that the vehicle operating condition recovers to the normal condition. Then, the above steps 214 and 215 shown in FIG.6B are performed to reset the detection flag FCLIM, the detection counter CTCLM, and the cancellation counter CTCLMCN to zero, and the stall detecting process ends.

FIGS.7C and 7D respectively show the changes of the values of the detection flag FCLIM and cancellation counter CTCLMCN when the stall detecting process described above is being performed. When the value of the detection counter CTCLM is greater than 5, the detection flag FCLIM is set to 1. The condition in which the detection flag FCLIM is equal to 1 continues for a time period indicated by an arrow "B" in FIG.7C, and during this period the stall detecting procedure is performed. At the time point t2, it is detected that the value of the cancellation counter CTCLMCN is greater than 5. The detection flag FCLIM is reset to 0, and the cancellation counter CTCLMCN is reset to 0. By performing the stall detection process shown in FIGS.6A and 6B, the function of the stall detecting part 13 according to the present invention is achieved.

In the above described embodiment of the traction control apparatus, when the detection flag FCLIM is equal to 1 in step 104 shown in FIG.3A, it is judged that a stalling condition occurs. Step 105 adds the value of 3 km/h to the target vehicle speed Vt3 so that the target vehicle speed Vt3 is increased. Thus, when a stalling condition is detected, a range of the target slip ratio to be controlled is changed from the shaded range "III" (the normal range) to the dotted range "IV" as indicated in FIG.5. Therefore, the driving force of the driving wheels can be increased to its peak value. The peak value of the driving force lies in the dotted range "IV" in FIG.5.

In the above described embodiment of the traction control apparatus, the driving force of the vehicle is increased when a stalling condition is detected during the traction control process. It is possible to stably prevent the vehicle from stalling or undergoing a loss of the power of the engine when the vehicle is running on a snowy road or uphill road. Also, in the above embodiment of the traction control apparatus, it is possible to prevent the vehicle from laterally slipping when the vehicle starts to turn around. Generally, when the vehicle is turning around, a predicted road friction force is reduced and the driving force in the vehicle front/rear direction is reduced so that the target vehicle speed Vt3 is likely to be lowered.

In the above described embodiment, the stall detection process is performed when the vehicle speed is within a low speed range between 5 km/h and 30 km/h. Even when the vehicle is turning, the target speed Vt3 of the driving wheels is increased when a stalling condition is detected. However, in a case of a traction control apparatus provided in another vehicle in which the vehicle stability during turning is increased, it is necessary to inhibit the performing of the stall detection process when the vehicle is turning. In this case, it is possible to quickly detect a stalling condition because the stall detection process can be performed if the vehicle speed is at a relatively high level.

In the above described embodiment of the traction control apparatus, the road friction force is calculated in step 103 in FIG.3A while the stall detection process is being performed. In order to prevent the predicted road friction force from being lowered when the vehicle is accelerating on a snowy road or uphill road, it is necessary to prohibit the calculation of the road friction force when the detection flag FCLIM is equal to 1.

Further, the present invention is not limited to the above described embodiment, and several variations and modifications may be made without departing from the scope of the present invention. For example, the changing part 14 according to the present invention may be replaced by a different means for increasing or widening a throttle opening of the sub-throttle valve 41 when a stalling condition is detected, or by another means for advancing an ignition timing of the spark plug 46 when a stalling condition is detected.

What is claimed is:

1. A traction control apparatus provided in an automotive vehicle, wherein the vehicle includes an engine and a plurality of driving wheels, the traction control apparatus comprising:

determining means for determining a slip ratio of the driving wheels;

drive torque control means coupled to said determining means for performing a traction control process in which a driving force applied to the driving wheels from the engine is controlled such that the driving force is reduced when the slip ratio determined by said determining means is greater than a predetermined slip ratio value;

detecting means for detecting whether or not an operating condition of the vehicle is a stalling condition; and changing means coupled to said drive torque control means and said detecting means for controlling said drive torque control means so that, when a stalling condition of the vehicle is detected by said detecting means, the driving force applied to the driving wheels by the engine is increased to prevent the vehicle from stalling, wherein said predetermined slip ratio value is controlled by said changing means such that, when a vehicle stalling condition is detected by said detecting means, the predetermined slip ratio value is increased to prevent the vehicle from stalling and so that, when no vehicle stalling condition is detected, the driving force applied to the driving wheels is maintained below a maximum driving force and a side force applied to the driving wheels is maintained above a predetermined side force value.

2. A traction control apparatus according to claim 1, wherein said changing means controls the drive torque control means by determining the predetermined slip ratio value, when a stalling condition of the vehicle is detected by the detecting means so that the driving force applied to the driving wheels by the engine is increased.

3. A traction control apparatus according to claim 1, wherein said detecting means detects whether an operating condition of the vehicle is a stalling condition only when an accelerator pedal of the vehicle is depressed.

4. A traction control apparatus according to claim 1, wherein the vehicle further includes a plurality of driven wheels and wherein the traction control apparatus further includes a plurality of speed sensors, each speed sensor being coupled to a corresponding driven wheel of the vehicle to detect a speed of the respective driven wheel, means for calculating a vehicle speed based on the driven wheel speeds sensed by the speed sensors and a memory for storing the calculated vehicle speed, wherein said detecting means detects a stalling condition of the vehicle when the currently calculated vehicle speed has remained smaller than a previously calculated vehicle speed stored in the memory for a prescribed period of time.

5. A traction control apparatus according to claim 1, wherein the vehicle further includes a plurality of driven wheels and wherein the traction control apparatus further includes a plurality of speed sensors, each speed sensor being coupled to a corresponding driven wheel of the vehicle to detect a speed of the respective driven wheel, means for calculating a vehicle speed based on the driven wheel speeds sensed by the speed sensors, wherein said detecting means detects whether an operating condition of the vehicle is a stalling condition only when the currently calculated vehicle speed is above a lower threshold value and below an upper threshold value.

6. A traction control apparatus according to claim 1, further comprising means for detecting a vehicle speed, wherein said determining means determines the slip ratio of the driving wheels by comparing a target rotating speed of the driving wheels to the detected vehicle speed.

7. A traction control apparatus according to claim 1, the vehicle further including a throttle valve, wherein, when the slip ratio determined by the determining means is not greater than the predetermined slip ratio value, said drive torque control means executes a feedback control process in which a target position of the throttle valve is set based on a previous target throttle valve position and wherein said drive toque control means reduces the driving force applied to the driving wheels by inhibiting, when the slip ratio determined by the determining means is greater than the predetermined slip ratio, the execution of the feedback control process.

8. A traction control apparatus according to claim 1, the vehicle further including a throttle valve provided in an intake passage of the engine, wherein, when the slip ratio is not greater than the predetermined slip ratio, said drive torque control means controls the driving force applied to the driving wheels by periodically performing a feedback control process in which a target position Ts(n) of the throttle valve is set based on a previous target throttle position Ts(n−1) and a correction amount Dts in accordance with the equation: Ts(n)=Ts(n−1)+Dts, and in which said throttle valve is operated in accordance with the target position.

9. A traction control apparatus according to claim 1, the vehicle further including a throttle valve provided in an intake passage of the engine, wherein said drive torque control means comprises a throttle valve actuator for adjusting a position of the throttle valve in accordance with a throttle position signal input to said throttle valve actuator.

10. A traction control apparatus according to claim 1, wherein, when the detecting means detects that the operating condition of the vehicle is a vehicle stalling condition, the detection means sets detection flag and wherein said changing means changes the predetermined slip ratio when the detection flag is set.

11. A traction control apparatus according to claim 1, the traction control apparatus further including means for detecting a vehicle speed, means for detecting a road condition, wherein the determining means calculates a target speed of the driving wheels based on the predetermined Slip ratio value and wherein said changing means changes the predetermined slip ratio by adding a predetermined speed value to the target speed of the driving wheels when a stalling condition is detected by said detecting means, said target speed being determined by the determining means based on the vehicle speed and the detected road condition, and wherein the new predetermined slip ratio corresponds to a value of the target speed added to the predetermined speed value.

12. A traction control apparatus according to claim 1, wherein said vehicle is provided with a first throttle valve operated in response to a position of an accelerator pedal set by a vehicle operator and a second throttle valve operated by a throttle valve actuator in accordance with a target throttle position determined by said drive torque control means.

* * * * *

UNITED STATES PATENT AND TRADEMARK OFFICE
CERTIFICATE OF CORRECTION

PATENT NO. : 5,459,661
DATED : October 17, 1995
INVENTOR(S) : Yoshifumi et al

It is certified that error appears in the above-indentified patent and that said Letters Patent is hereby corrected as shown below:

| Column | Line | Corrections |
|--------|------|-------------|
| 4 | 65 | After "$K2$" insert -- $K3$ --. |
| 5 | 26 | Before "In" delete ".". |
| 5 | 54 | Change "Vto<40" to --Vto$\leq$40--. |
| 5 | 65 | Change ' ""o" ' to --"$\mu$o"--. |
| 8 | 9 | Change "actuator 40" to --actuator 42--. |
| 10 | 15 | Change "(CTCLMCN=6)" to --(CTCLMCN>5)--. |
| 13 | 3 | Change "Slip" to --slip--. |

Signed and Sealed this

Nineteenth Day of March, 1996

Attest:

BRUCE LEHMAN

Attesting Officer     Commissioner of Patents and Trademarks